(12) United States Patent
Whiteman et al.

(10) Patent No.: US 6,363,826 B1
(45) Date of Patent: *Apr. 2, 2002

(54) HOLE PUNCH QUICK-CHANGE DIE ASSEMBLY WITH PIN STRAP AND POSITIONING SYSTEM

(75) Inventors: Marvin Whiteman; Wayne Malmstrom, both of Boise, ID (US)

(73) Assignee: Performance Design, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,816

(22) Filed: Apr. 11, 2000

Related U.S. Application Data

(63) Continuation-in-part of application No. 09/076,920, filed on May 12, 1998, now Pat. No. 6,047,623, which is a continuation-in-part of application No. 08/611,301, filed on Mar. 5, 1996, now Pat. No. 5,771,268.

(51) Int. Cl.[7] .............................................. B26B 1/12
(52) U.S. Cl. ........................ 83/698.91; 83/571; 83/618; 83/687
(58) Field of Search .............................. 83/620, 698.91, 83/687, 691, 628, 571, 618, 599; 412/9, 11, 16; 124/38, 131

(56) References Cited

U.S. PATENT DOCUMENTS

| | | | | |
|---|---|---|---|---|
| 807,295 A | * | 12/1905 | Lincoln | 83/620 X |
| 2,039,251 A | * | 4/1936 | Knight | 83/620 X |
| 2,481,883 A | * | 9/1949 | Semler | 83/618 |
| 2,745,492 A | * | 5/1956 | Brook | 83/618 |
| 2,957,380 A | * | 10/1960 | Duncan et al. | 83/571 |
| 3,060,780 A | * | 10/1962 | Stuckens | 83/618 |
| 3,083,604 A | * | 4/1963 | Ferren | 83/687 X |
| 3,452,925 A | * | 7/1969 | Gettle et al. | 234/38 X |
| 3,477,317 A | * | 11/1969 | Liander | 83/620 X |
| 3,500,710 A | * | 3/1970 | Taber | 83/620 X |
| 3,512,435 A | * | 5/1970 | Bossmann et al. | 83/620 X |
| 3,559,522 A | * | 2/1971 | Valente | 83/571 |
| 3,631,753 A | * | 1/1972 | Thomas et al. | 83/399 |

(List continued on next page.)

FOREIGN PATENT DOCUMENTS

| | | | | |
|---|---|---|---|---|
| DE | 3230312 A1 | * | 2/1984 | 83/628 |
| EP | 540828 A1 | * | 5/1993 | 83/687 |

*Primary Examiner*—Rinaldi I. Rada
*Assistant Examiner*—Charles Goodman
(74) *Attorney, Agent, or Firm*—Pedersen & Company, PLLC; Ken J. Pedersen; Barbara S. Pedersen

(57) ABSTRACT

Embodiments of an punch machine and a quick-change die assembly are shown and described. The die assembly may be quickly installed and removed from the punch machine, without bolting or unbolting of either machine housing or the die assembly itself. The die assembly is slid into the machine through a hole in the machine housing and into a position which mates part of the die assembly with the push-bar. A clamp, with a handle outside the machine, is then pivoted against the die assembly. The push-bar is adapted to be self-supporting without being bolted to the die assembly, keeping the push-bar in place without manual adjustment and alignment. The die assembly preferably includes a die, pin retainer, and punch pins, and preferably includes a flexible, pivotal, or hinged pin strap to secure the pins to the retainer. The preferred die assembly includes a positioning system that biases the pin retainer with its pin heads out from the die a proper distance for easy and unobstructed sliding into the machine housing and into a channel of the bar that drives the die assembly. The die assembly preferably includes a system for consistent referencing between various die assemblies, for reducing the instances in which the paper stop must be adjusted when a die assembly is changed.

10 Claims, 16 Drawing Sheets

U.S. PATENT DOCUMENTS

| | | | | |
|---|---|---|---|---|
| 3,673,908 A | * | 7/1972 | Smith | 83/698.91 |
| 3,750,502 A | * | 8/1973 | Ball | 83/620 X |
| 3,808,933 A | * | 5/1974 | Buan | 83/588 |
| 3,908,498 A | * | 9/1975 | Seaborn | 83/210 |
| 3,945,073 A | * | 3/1976 | Adams | 412/39 |
| 3,948,129 A | * | 4/1976 | Plegat | 83/157 |
| 3,967,336 A | * | 7/1976 | Cutter | 412/13 |
| 3,985,056 A | * | 10/1976 | Oseto | 83/552 |
| 4,000,673 A | * | 1/1977 | Lyon | 83/620 |
| 4,014,232 A | * | 3/1977 | Mauger | 83/618 |
| 4,033,037 A | * | 7/1977 | Cooley | 30/363 |
| 4,044,946 A | * | 8/1977 | Cless et al. | 234/39 |
| 4,079,647 A | * | 3/1978 | Elder et al. | 83/441.1 |
| 4,354,783 A | * | 10/1982 | Szanto | 412/13 |
| 4,434,690 A | * | 3/1984 | Mauer | 83/13 |
| 4,442,743 A | * | 4/1984 | Szanto | 83/372 |
| 4,449,436 A | * | 5/1984 | Semerjian et al. | 83/698.91 |
| 4,480,782 A | * | 11/1984 | Morishima | 234/98 |
| 4,494,432 A | * | 1/1985 | Kogane | 83/559 |
| 4,555,966 A | * | 12/1985 | Klingel | 83/71 |
| 4,574,669 A | * | 3/1986 | Vercillo et la. | 83/399 |
| 4,587,830 A | * | 5/1986 | Mills | 83/698.91 |
| 4,656,907 A | * | 4/1987 | Hymmen | 83/571 |
| 4,688,456 A | * | 8/1987 | Stursberg | 83/368 |
| 4,724,734 A | * | 2/1988 | Hse | 83/549 |
| 4,898,055 A | * | 2/1990 | Neilsen | 83/571 |
| 4,907,481 A | * | 3/1990 | Dvorak et al. | 83/571 |
| 5,027,683 A | * | 7/1991 | Kakimoto | 83/76.6 |
| 5,090,859 A | * | 2/1992 | Nanos et al. | 412/11 |
| 5,096,108 A | * | 3/1992 | Kuze | 83/620 X |
| 5,143,502 A | * | 9/1992 | Kaufmann et al. | 83/571 |
| 5,163,350 A | * | 11/1992 | Groswith, III et al. | 83/549 |
| 5,183,361 A | * | 2/1993 | Ho | 412/16 |
| 5,211,522 A | * | 5/1993 | Ho | 412/16 |
| 5,291,813 A | * | 3/1994 | Blumenthal et al. | 83/599 |
| 5,386,638 A | * | 2/1995 | Weber | 30/358 |
| 5,429,573 A | * | 7/1995 | Jahnke et al. | 483/1 |
| 5,517,888 A | * | 5/1996 | Ray | 83/620 X |
| 5,771,768 A | * | 6/1998 | Malstrom | 83/571 |
| 5,829,334 A | * | 11/1998 | Evans et al. | 83/618 |
| 5,884,546 A | * | 3/1999 | Johnson | 83/698.91 X |
| 6,047,623 A | * | 4/2000 | Whiteman et al. | 83/618 |
| 6,119,555 A | * | 9/2000 | DiMaria | 83/691 X |

* cited by examiner

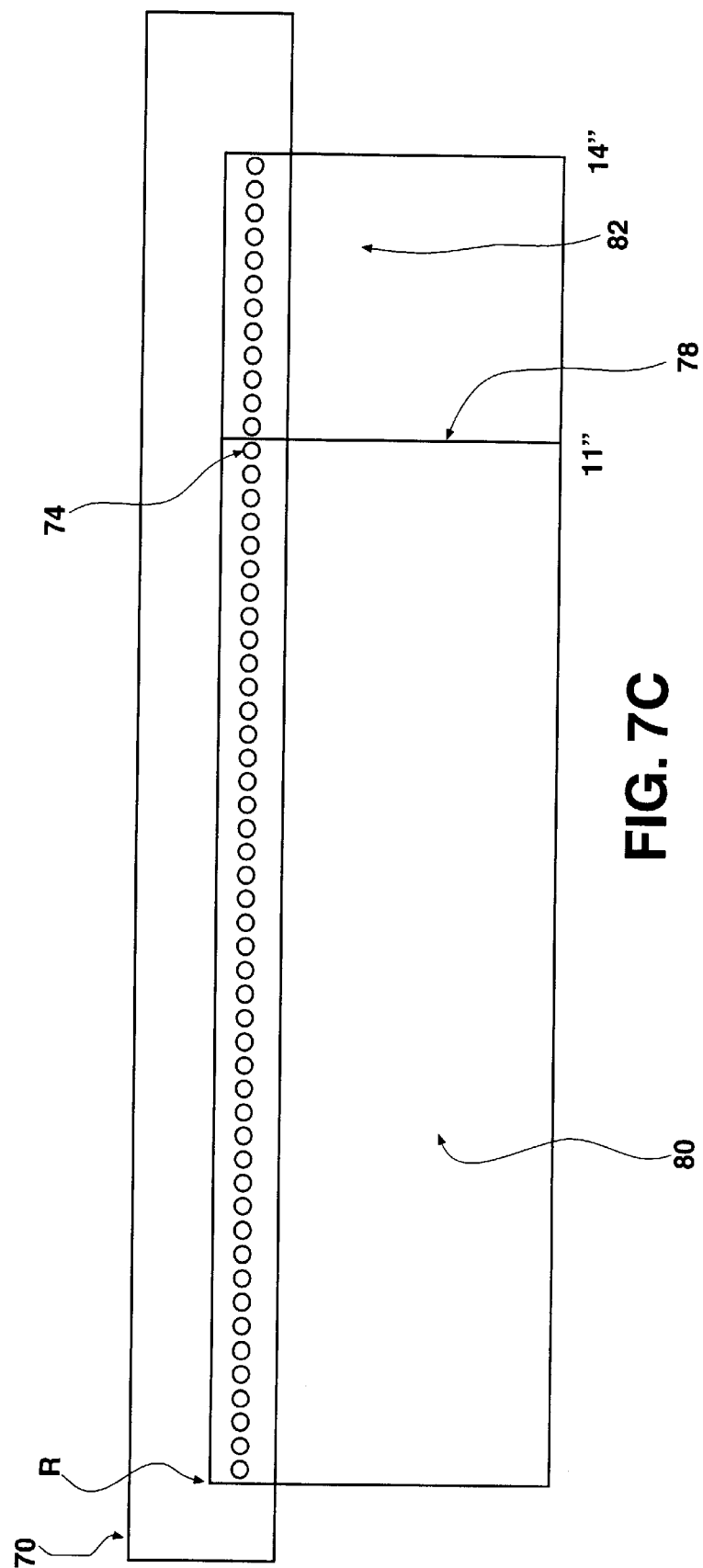

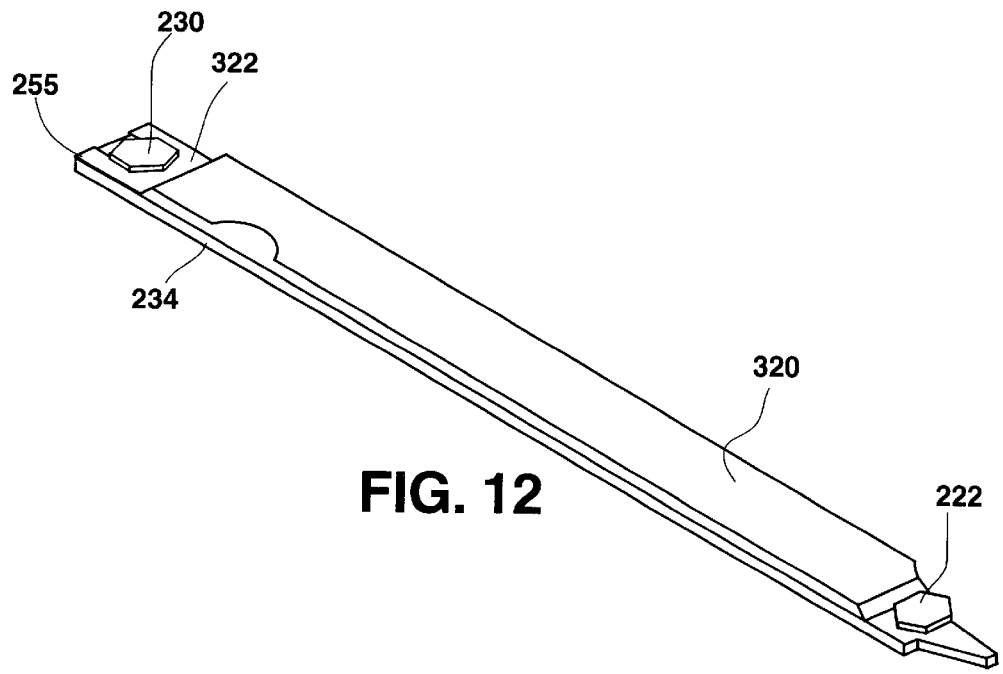
FIG. 12
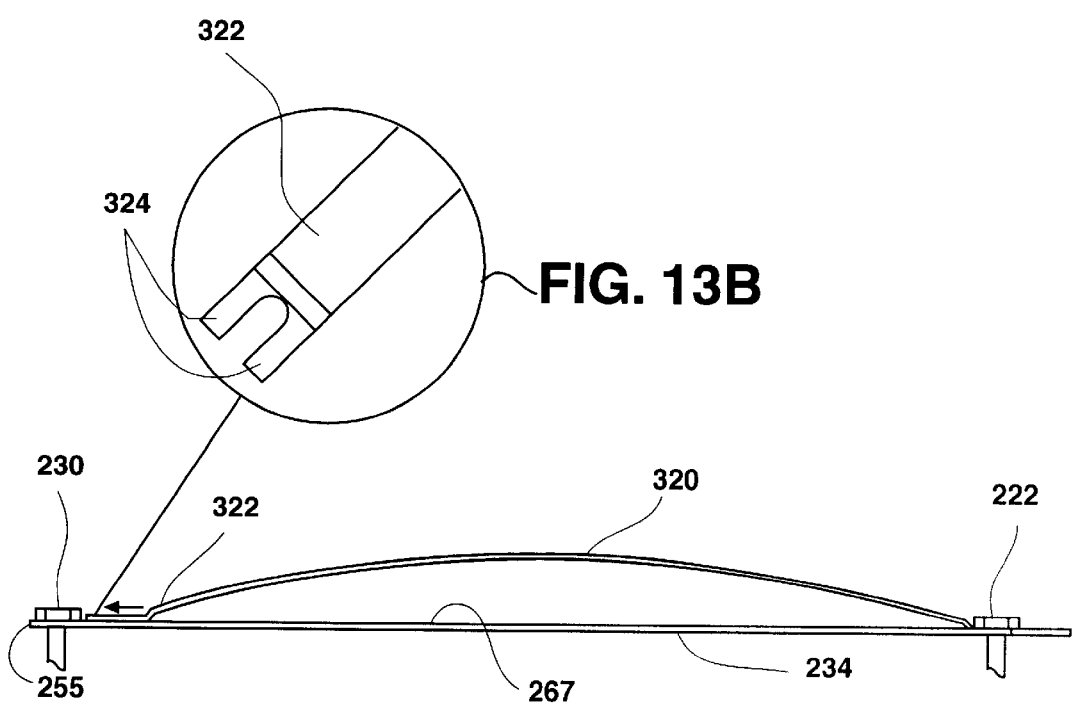
FIG. 13B
FIG. 13A

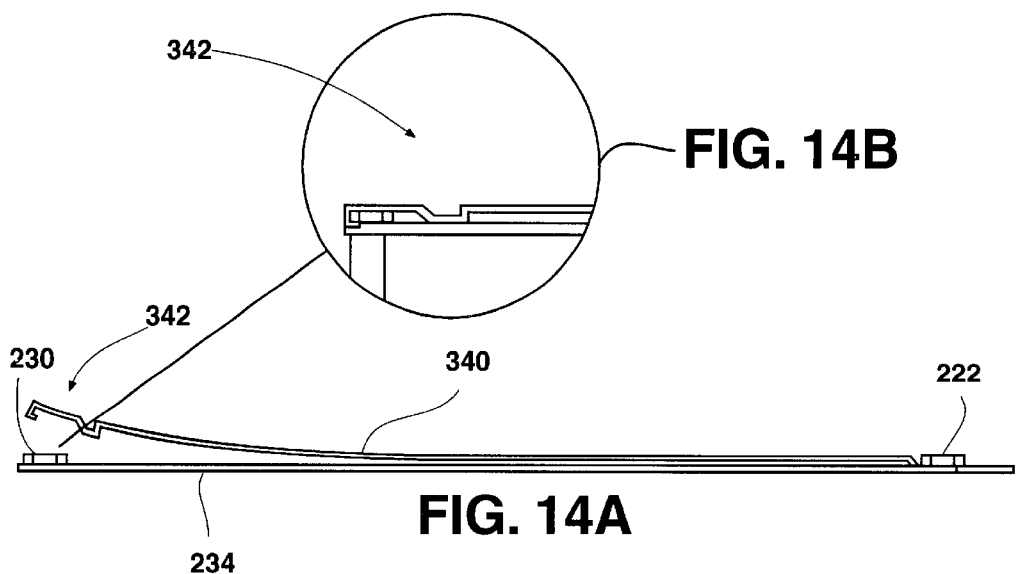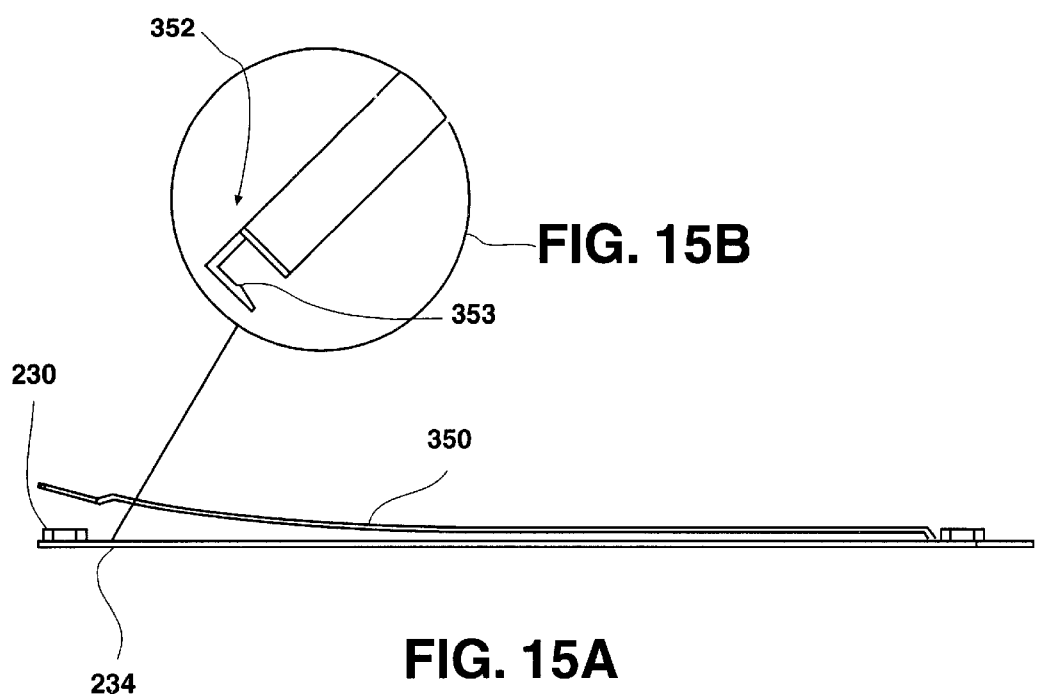

HOLE PUNCH QUICK-CHANGE DIE ASSEMBLY WITH PIN STRAP AND POSITIONING SYSTEM

DESCRIPTION

This application is a continuation-in-part of, and claims priority of, prior, U.S. patent application Ser. No. 09/076,920, filed May 12, 1998, entitled "Hole Punch Quick-Change Die Assembly with Pin Strap and Positioning System," issuing on Apr. 11, 2000 as U.S. Pat. No. 6,047,623, which is incorporated herein by reference, and which is a continuation-in-part of Ser. No. 08/611,301, entitled "Hole Punch with Quick-Change Die Assembly", filed Mar. 5, 1996, issued as U.S. Pat. No. 5,771,768 on June 1998.

BACKGROUND OF THE INVENTION

1. Field of the Invention

This invention relates, generally, to automatic paper hole punches, for preparing paper for binding into a spiral notebook, for example. More specifically, this invention relates to a punch machine that has an improved die assembly and mounting means, allowing the die assembly to be quickly installed and removed without bolts, screws or housing panel removal.

2. Related Art

Many automatic punch machines have been built with die assemblies for punching holes through a stack of papers prior to binding. Typically, these die assemblies are bolted into the machine and can be removed for cleaning, replacement or adjustment only by partially disassembling the machine. Bolts, screws, housing panels, and sometimes other machine parts must be removed to remove and replace the die assembly. Although such punch machines can be built to operate effectively and reliably, maintenance of the die assembly is not quick or easy.

One automatic punch with a bolt-in die assembly is the "Versa-Punch™", model VP-6000, made by Performance Design, Inc., of Boise, Id. This punch 100 is shown in FIGS. 1A and 1B. This punch machine includes a die assembly with a plurality of punch pins that are forced generally perpendicularly through the paper near the paper edge. The paper is held vertically with its edge inserted into a slot in the die assembly. The punch pins are then driven across the slot to cut through the paper, creating a hole in each paper at the location of each punch pin.

In order to access the die assembly 102 of the Versa-Punch™ machine, the user must unscrew four screws or bolts 104 to remove a top cover 106 and a front cover 108. Then, to remove the die assembly, four bolts 110 must be removed to detach the die assembly from the machine frame and three more bolts 112 must be removed to detach the assembly 102 from the push-bar 114. To replace the die assembly, the procedure is repeated in reverse, with the user having to hold the die assembly in place to align it with the various bolt holes.

The die assembly 102 shown in FIG. 1B is a square-hole design, which includes a die and a pull-back bar that each have square holes and that are connected by stripper bolts and bushings. This die assembly 102 also includes push-pins and square-end punch pins. The push-pins are pushed into bores in the top of the pull-back bar to engage each punch pin, that is, to secure each punch pin in a position in the pull-back bar that will result in punching of the paper.

Another example of a prior art die assembly that may be used in the bolt-in system is illustrated in FIG. 2. This die assembly 102' typically includes a die 116 with paper slot and die holes, a pull-back bar 118 with holes for receiving a plurality of punch pins 120, and a backup bar 122 screwed onto the pull-back bar for keeping the pins in the pull-back bar. The pull-back bar 118 is connected to the die 116 by means of the stripper bolts. To punch paper, the push-bar 114 drives the pull-back bar 118 forward and backward on bushings on the stripper bolts 126, thus moving the punch pins 120 forward and backward in the die holes 128. The push-bar 114 is supported inside the punch machine 100 only by its attachment to the connecting rods and its being bolted to the die assembly 102.

These die assemblies 102, 102', and the many other typical assemblies made for various binding coils and combs, each has a uniquely sized, spaced and shaped set of holes which typically are centered along about a 14 inch length of the die that is typically centered between the two ends of the die. Therefore, when the user wishes to punch standard 8½-x-11-inch paper instead of the 14-inch paper, the user must move the paper stop 60 to accommodate the paper and also move the stop each time he/she changes the die assembly. If this adjustment is not made, the punched holes are not centered along the 11-inch paper edge. The holes may be slightly offset to the right or left, and a partial hole may be cut at one or both ends of the paper edge. This results in inferior binding and an unprofessional appearance. For example, as shown with the prior art die assembly 130 of FIG. 7A, the paper stop and left edge of the paper are set at "S" for punching the 14-inch paper. When the same paper stop setting is used for 11-inch paper in this same die 130, the holes in the 11-inch paper are not centered and the far right hole 132 extends to or past the 11 inch paper edge. When maintaining the same paper stop position and switching to another prior art die assembly 134, again the holes are centered within the 14-inch length, but punching 11-inch long paper results in the holes not being centered along the 11-inch length and the far right hole 136 being nearly at the paper edge. To properly punch the 11-inch paper with these two dies 130, 134 requires adjustment of the paper stop to a different position than used for the 14 inch paper and to different positions for the two dies.

SUMMARY OF THE INVENTION

This invention comprises a punch machine and quick-change die assembly for punching holes in paper or other sheets of material. The die assembly is supported and secured inside the punch machine housing by a lateral slidable connection with the push-bar and by clamp means that may be easily operated from outside the machine housing. The die assembly need not be bolted to the machine frame or the push-bar and may be quickly removed simply by being unclamped, preferably by simply swinging a clamp handle, and slid out of the machine housing.

The invented punch machine also comprises an improved push-bar system for driving the die assembly. The push-bar is slidably supported in the punch machine, preferably by bushings in the side plates of the machine housing. Thus, the push-bar stays in place when the die assembly is removed, so that the die assembly may easily be reinserted without manually moving and aligning the die assembly and push-bar.

The preferred die assembly is simplified in structure compared to conventional die assemblies and comprises a die, pins, and pin retainer (also referred to as a "pin retainer plate") that slidably receives the pins, and, in an especially-preferred embodiment, also a moveable pin strap for keeping the pins in place during handling and installation of the die assembly, and a positioning system for optimizing the position of the pins and the pin retainer relative to the die during the installation of the die assembly into the punch machine. When the die assembly is installed in the punch machine, the die and pin retainer are mounted in the machine housing by the clamp(s) and push-bar slot, respectively, with the punch pins extending from the retainer to the die. The push-bar then moves the pin retainer relative to the die, thus, pushing and pulling the punch pins in and out of the die holes.

The die and pin retainer need not be bolted together or connected by any bushings or stripping bolts. However, in the especially-preferred embodiment, the invented positioning system includes a connecting mechanism for connecting the pin retainer to the die, so that the pin retainer will not fall away from the die. The positioning system preferably holds the pin retainer at the desirable distance from the die during handling and installation. The positioning system may be designed to bias the pin retainer out from the die at a set distance (that is, the "biased position"), which is the distance that is proper for the die assembly to slide smoothly into the machine, with the pin retainer sliding into the push-bar slot and the die sliding into proper clamping position. The positioning system with its biasing system is adapted so that, once the die assembly is installed, it does not interfere with forward and rearward movement of the pin retainer and pins during punching. The positioning system may also be adapted to include a floating feature that allows some leeway in the biased position of the pin retainer (and in the position of the associated apparatus that must slide through the push-bar slot), thus compensating for possible variations in the push-bar location at the time of installation of the die assembly. For example, this leeway may be necessary if wear and/or variations in punch machine construction result in the punch bar being slightly forward or rearward from its "standard" position when the push-bar operation is stopped. The leeway lets the pin retainer, pin heads, pin strap, and connecting mechanism move to match up with the location of the push-bar slot and smoothly slide into place.

The quick-change die assembly also provides a simplified and quick method of changing or rearranging punch pins. When the die assembly is removed from the machine, one or more punch pins may easily backed out from the pin retainer. Many embodiments of the die assembly are adapted so that, once the die assembly is installed in the punch machine, the pins are held in the pin retainer only by the push-bar and preferably without other backing and without bolts.

In the especially-preferred embodiment, however, the movable pin strap, which is normally positioned over the pins during handling and installation of the die assembly in the machine, may be pivoted or otherwise moved aside quickly, easily, and without tools, for assess to the pins. In embodiments having a pin strap, the pins of the installed die assembly are held in place between the pin retainer and the pin strap, with the pin strap being located between the pin heads and the push-bar when the die assembly is installed in the punch machine.

The die assembly preferably also includes a consistently-referenced system of die hole placement, so that the paper stop need not be adjusted each time a different style die assembly is installed. This system is called herein an "end-justified" system because the 11-inch area at one end of the die has its holes centered within that 11 inch area. This system allows the die assemblies to be more compatible with the preferred paper size, for example, 8½-x-11-inch paper, so that the paper stop need only be changed for the occasional punching of longer or shorter paper.

BRIEF DESCRIPTION OF THE DRAWINGS

FIG. 12 is an isometric view of an alternative embodiment of a pin strap shown on a pin retainer, according to the invention.

FIG. 13A is a side view of the pin strap and pin retainer of FIG. 12. FIG. 13B is a detail of the latch mechanism of FIG. 13A.

FIG. 14A is a side view of another embodiment of a pin strap on a pin retainer. FIG. 14B is a detail view of the latch mechanism of FIG. 14A.

FIG. 15A is a side view of yet another embodiment of a pin strap on a pin retainer. FIG. 15B is a detail view of the latch mechanism of FIG. 15B.

DESCRIPTION OF THE PREFERRED EMBODIMENTS

Figure 1A:
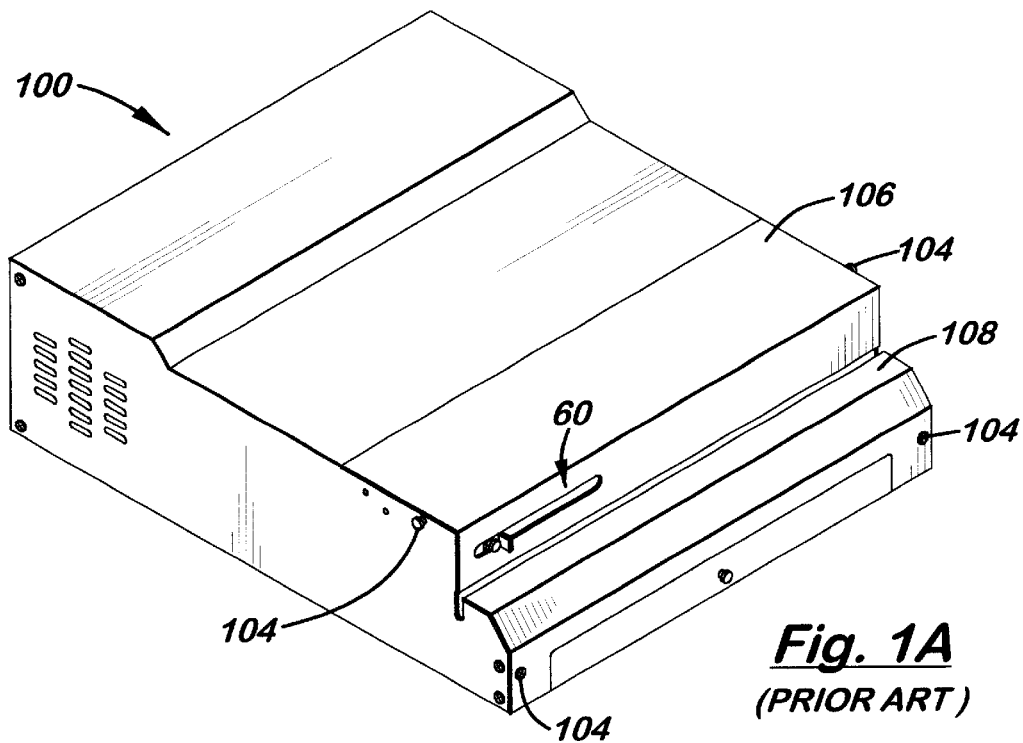
FIG. 1A is an isometric front view showing a prior art automatic punch machine.
Figure 1B:
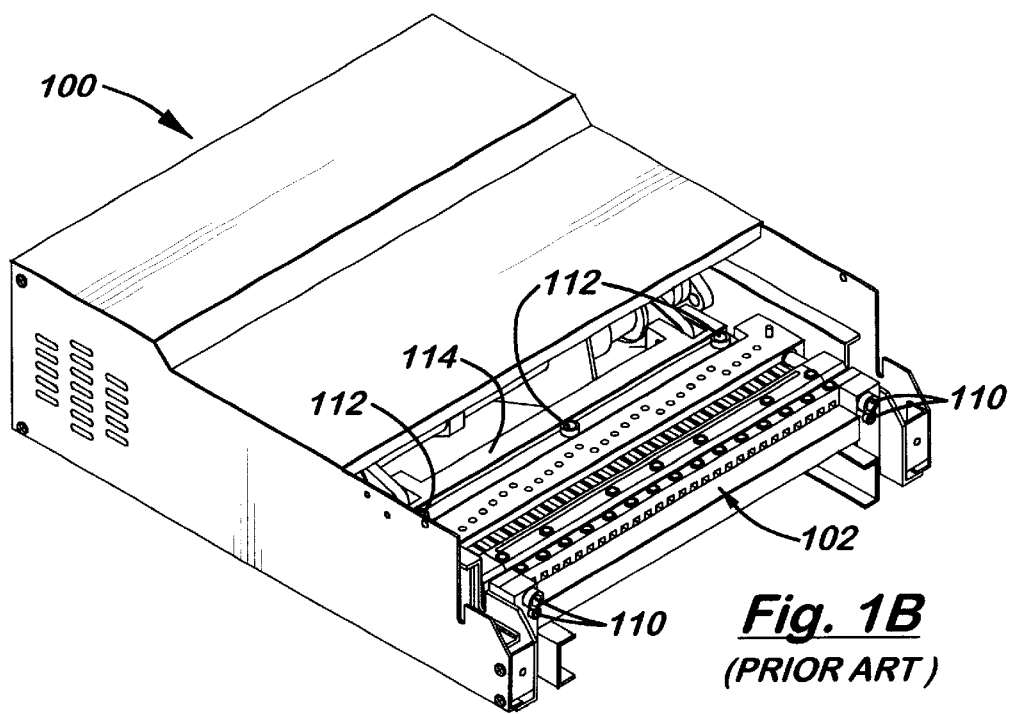
FIG. 1B is an isometric front view of the prior art punch machine of FIG. 1A, with top and front covers removed to reveal the prior art die assembly and its associated bolts.
Figure 2:
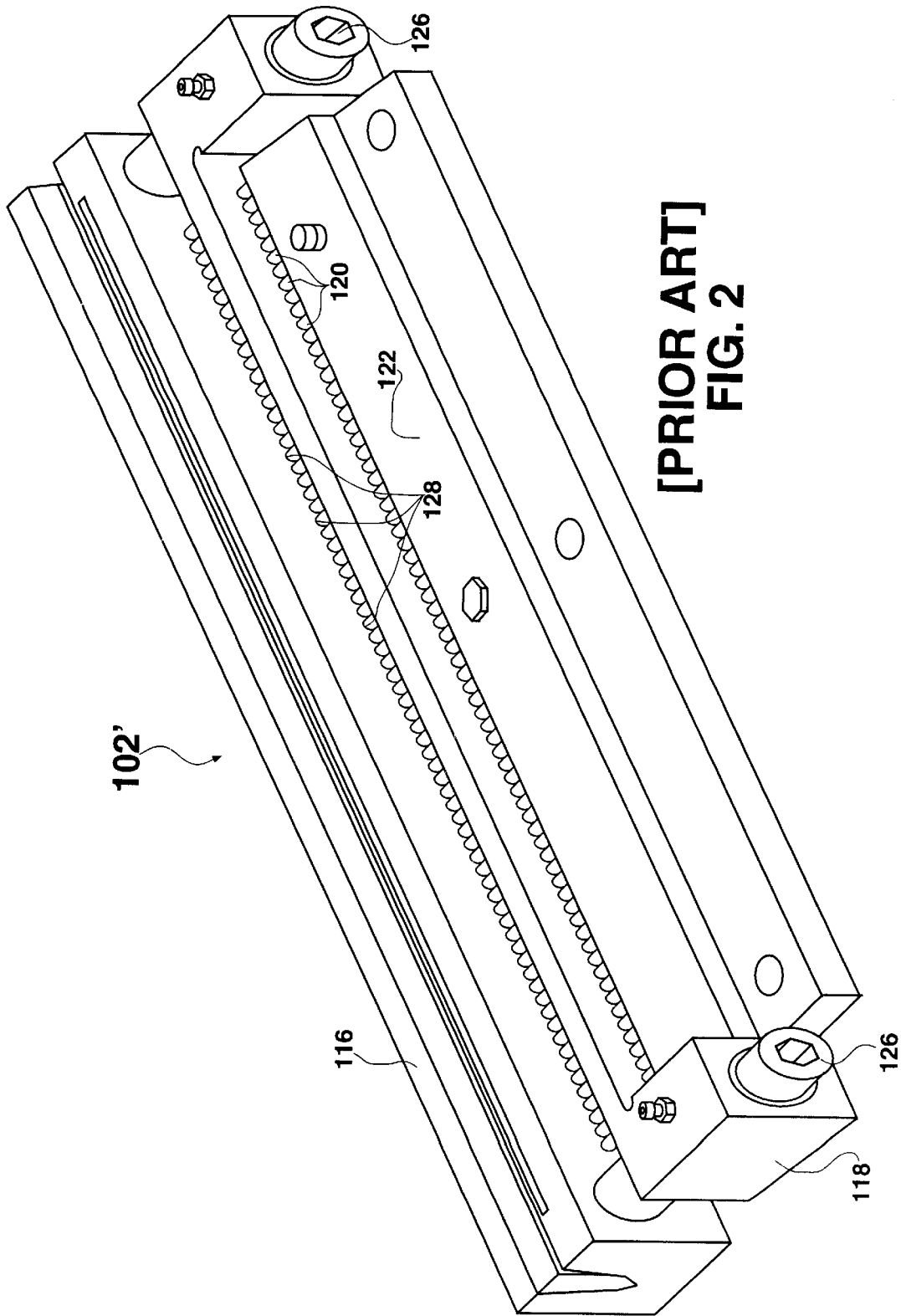
FIG. 2 is an isometric rear view of an alternative prior art die assembly for use with the punch machine of FIGS. 1A and B.
Figure 3:
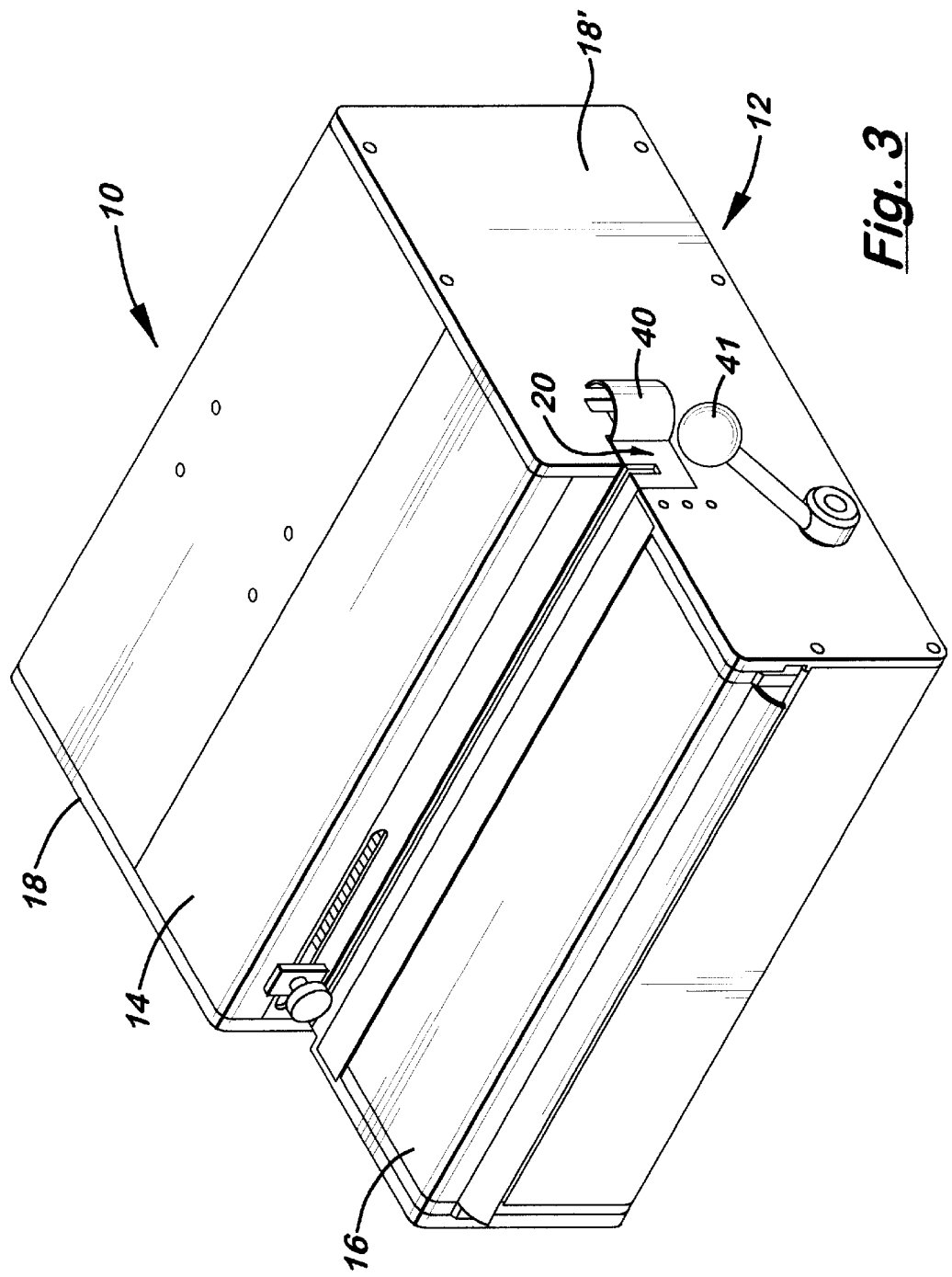
FIG. 3 is an isometric front view of one embodiment of the punch machine invention, with one embodiment of the invented die assembly clamped inside.
Figure 4:
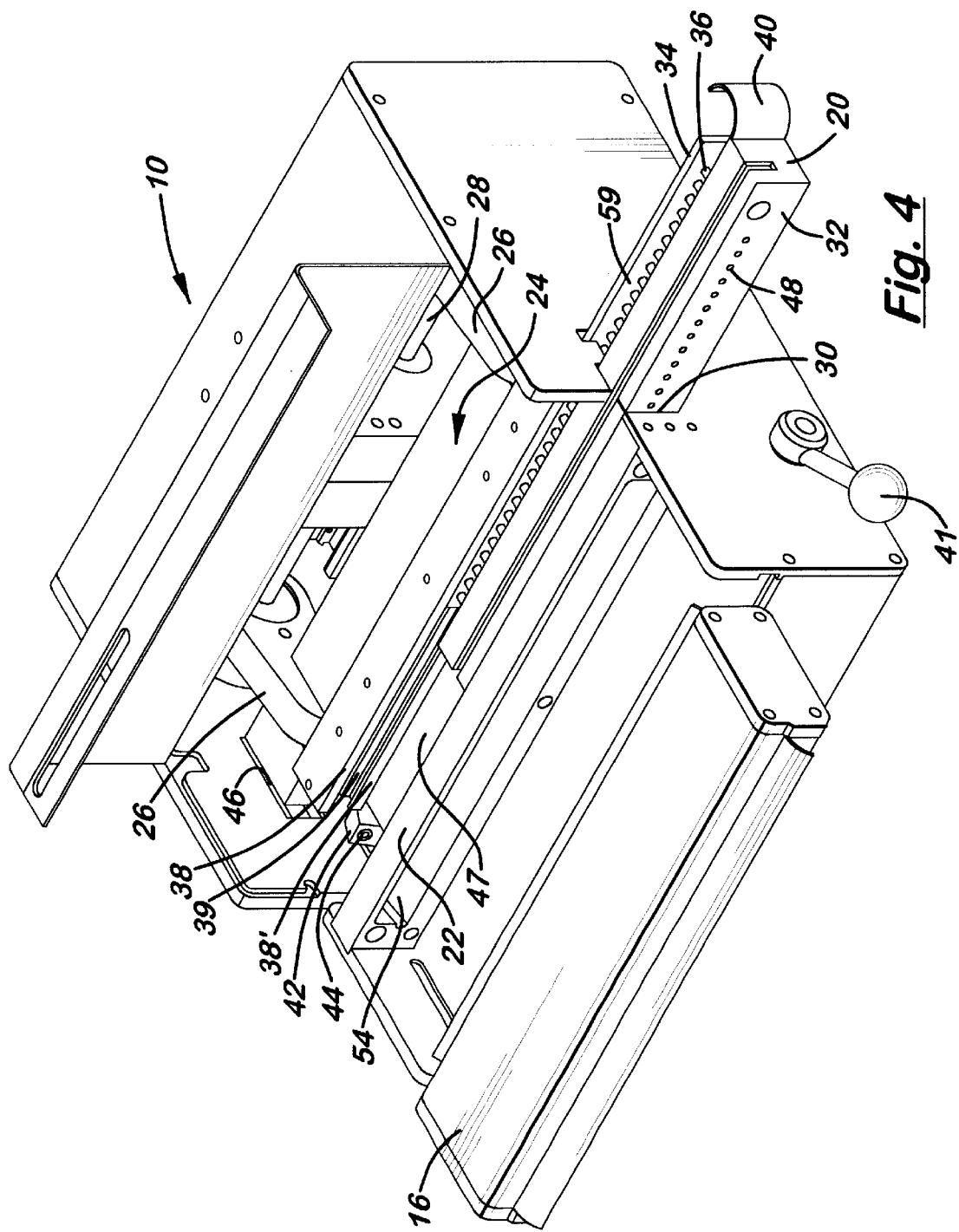
FIG. 4 is an isometric front view of the embodiment of FIG. 3, shown with front drawer pulled forward, top lid opened, and die assembly unclamped and partially removed.

Referring to FIGS. 3–6, there is shown one, but not the only, embodiment of the invented punch machine 10. Punch machine 10 comprises machine housing 12, with hinged top lid 14, front drawer 16 and sidewalls 18, 18'. The housing 12 encloses an interior space for holding the workings of the machine, including the die assembly 20, front cross bar 22, push-bar 24, and the drive system, including connecting rods 26, crankshaft 28, gear box, motor, and wiring. The drive system may be of various designs, such as that used in a conventional bolt-in die machine or others that are well known to those skilled in the field of punch equipment.

Starting the description toward the front of the machine 10, front cross bar 22 extends across the interior space to provide a front support surface for die assembly 20. Die assembly 20 is installed by sliding it through sidewall opening 30 and between cross bar 22 and push-bar 24. During this installation, the die 32 slides along cross bar 22 and the pin retainer 34 (also referred to as a "pin retainer plate") holding its punch pins 36, slides along push-bar 24 in between the upper and lower push-bar caps 38, 38'. These push-bar caps 38, 38' act as lips that extend around the top and bottom edges of the pin retainer 34 far enough to form a C-shaped channel or slide, herein called push-bar slot 39, which may be described as a slot or C-channel located in the front surface 35 of the push-bar and having an open end 49. This lipped slot 39 captures the retainer 34 so that it is supported by the push-bar 24 and can be driven forward and backward with linear movement of the push-bar 24.

Preferably, sidewall opening 30 is shaped similarly to the end profile of the die assembly 20 when it is in the non-punching position, in order to guide the die assembly 20 properly into place between cross bar 22 and push-bar 24. Once installed, a die assembly handle 40 extends out of the housing 12.

Figure 5A:
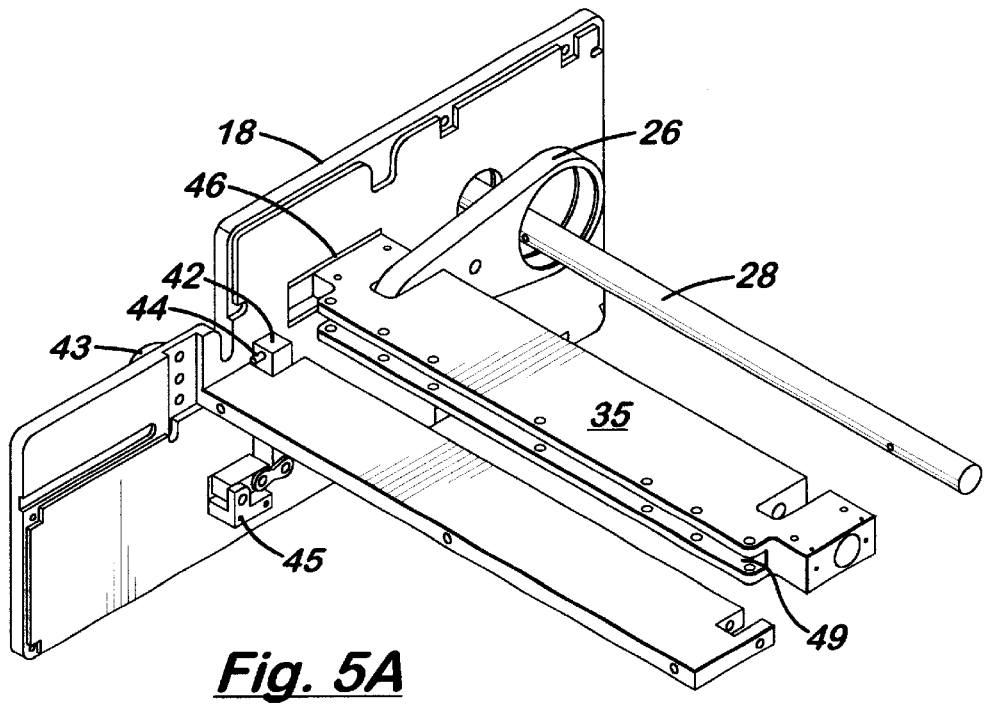
FIG. 5A is an isometric partial view of the embodiment of FIG. 3, without the die assembly and without the push-bar caps, showing the left side clamp assembly in locked position.
Figure 5B:
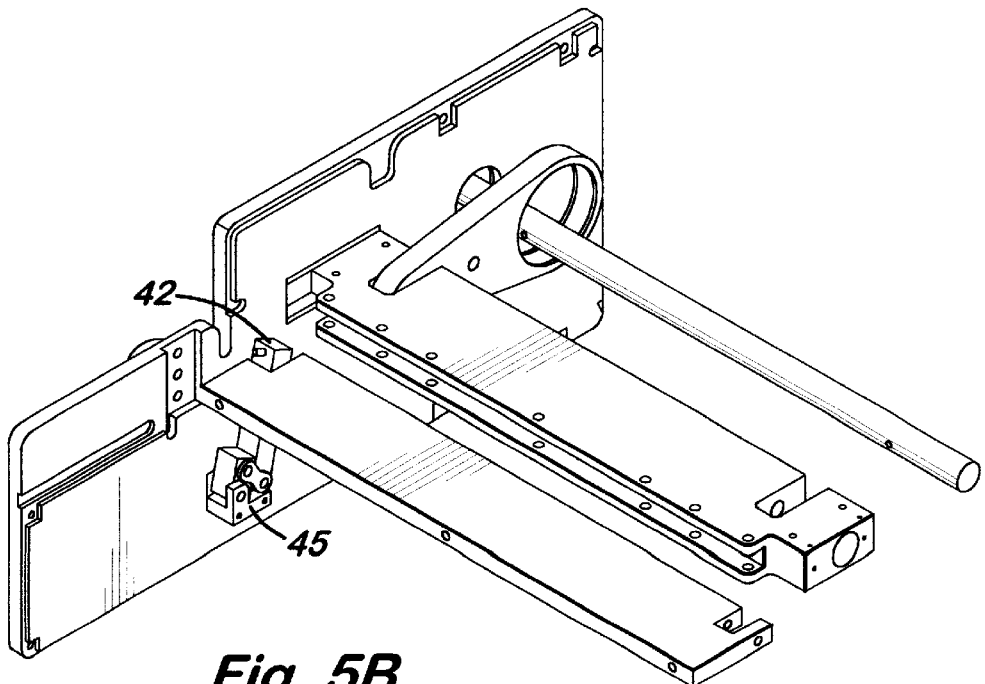
FIG. 5B is an isometric partial view, as in FIG. 5A, showing the left side clamp assembly in unlocked position.

Die assembly 20 is locked in place by a clamp means, preferably mirror image clamp assemblies located on each side of the machine 10. To lock the clamp assemblies, right clamp handle 41 and left clamp handle 43 may be swung up to pivot right clamp pivot bar (not shown) and left pivot bar 42, respectively, toward the back surface of the die 32 to force the die 32 forward against the cross bar 22, which serves as an anchor member. Preferably, the die 32 also rests on top of a die support plate 47. The die 32 is preferably longer than and extends beyond each end of the pin retainer 34, so that the pivot bars can reach the die back surface. The clamped and unclamped positions of a clamp bar 42 and associated linkage 45 are illustrated in FIGS. 5A and 5B.

The clamp assembly pivot bar 42 includes a clamp pin 44 or other protrusion, which presses against the back surface of the die 32 when the clamp assembly is in the locked position. The pressure of the clamp pin 44 against the back surface is great enough to secure the die 32 against the cross bar 22 and to prevent sideways movement of the die 32 and die assembly 20 during use. The die 32 back surface may include a hardened insert or coating to stand up to the force of the clamp pin 44.

Push-bar 24 is supported at its opposing ends by bushings 46 connected to the sidewalls 18, 18'. In use, push-bar 24 slides linearly forward and backward in the bushings 46. When the machine 10 is stopped and the die assembly 20 removed, this support means ensures that the push-bar 24 does not drop down or otherwise move out of the alignment desired for reinsertion of the die assembly 20.

Figure 6:
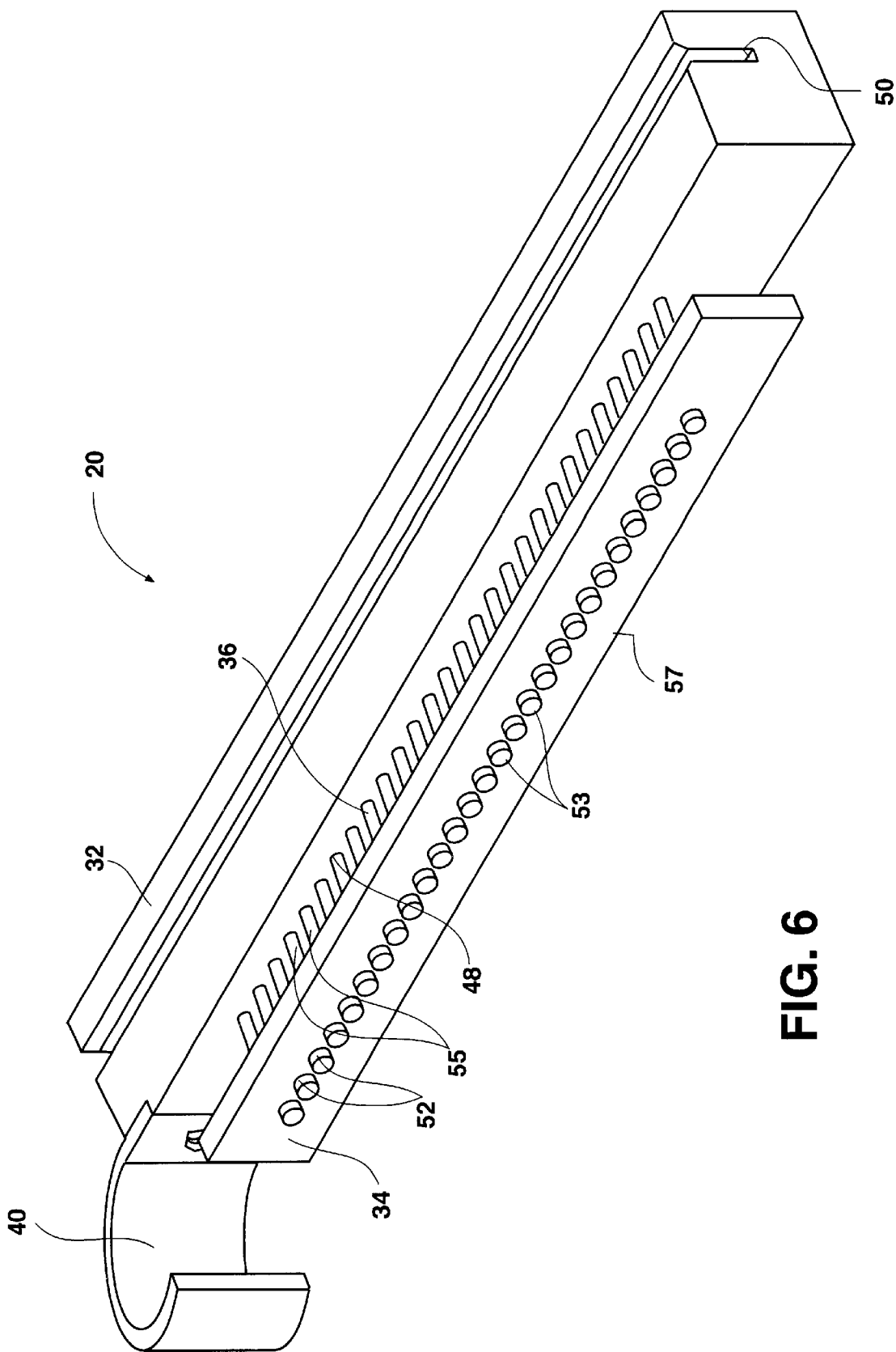
FIG. 6 is an isometric view of the die assembly embodiment of FIG. 3, except fitted with a handle for a left-side entry punch machine.

A preferred die assembly 20 is shown in detail in FIG. 6. The die assembly 20 is preferably designed with a minimum of parts, namely, die 32 with die holes 48, punch pins 36, and pin retainer 34. Preferably the die 32 is a generally rectangular bar, having parallel holes 48 or other bores extending through the bar from front to back and perpendicular to the longitudinal axis of the die 32. The die 32 has a generally vertical slot 50 running along the top surface from end to end for receiving edges of paper. The slot 50 extends into the die 32 far enough so that, when the paper edges extend to the bottom of the slot, they extend down past the holes 48. The pins 36 are typically elongated shafts having a first end with a head 53 and a second end 55 adapted to fit smoothly into the corresponding die hole 48, as in conventional die assemblies. The preferred pin retainer 34 is an elongated vertical plate having a plurality of retainer holes 52 bored through it, extending from the retainer 34 back surface 57 to front surface 59 perpendicularly to the retainer 34 longitudinal axis. The punch pins 36 extend through the pin retainer 34 from back to front, so that the pin heads are held in back of the retainer 34 and abut against the pin retainer back surface. The pins 36 then extend into the die holes 48 preferably to an extent that, when the push-bar is moved backward, the pin ends are in the die holes 48 but not across the slot 50, and, when the push-bar is moved forward, the pin ends extend across the slot 50. Alternatively, other die hole and punch pin shapes and configurations may be used, for example, square or rectangular pins.

To install the die assembly 20 in the punch machine 10, the die 32 and retainer 34 are placed together outside the punch machine, with the retainer 34 pulled partly out from the die 32 as it is when the machine is in the off of non-punching position. With the clamp assemblies in the unlocked position and the push-bar 24 resting in the backward position near the back of the bushings 46, the die assembly 20 is then slid into the punch machine, so that the pin retainer slides into the push-bar slot. The clamp assemblies are then locked to secure the die 32 against the cross bar 22, and the die assembly is ready for use.

The punch machine 10 is used, in general, in a way similar to conventional punch machines. A stack of paper is held vertically above the machine 10 with the paper edges in the slot 50. A foot pedal or other actuating means is used to start the machine 10. Crankshaft 28 turns connector rods 26, which translate rotary motion to linear motion of the push-bar 24. The push-bar 24 moves forward in the support bushings 46 and pushes the pin retainer 34 and pins 36 forward. Pins 36 enter the slot 50 and cut through the paper. The pin retainer 34 and pins 36 are then moved backward by the push-bar 24 to remove the pins 36 from the paper and slot 50, so that the paper may be removed from machine 10.

A drawer assembly 16 is preferably included at the front of the machine 20 for catching the paper pieces cut by the die assembly. The paper pieces fall out from the front of the die holes 48, through the slanted interior 54 of the cross bar 22, and into a back opening of the drawer assembly 16. Preferably, the drawer assembly 16 may be pulled out or easily removed for emptying and for gaining access to the machine interior space.

An adjustable paper stop, which is illustrated in FIG. 1A as stop 60, may be included on the punch machine 10 for acting as a limit against which to place the paper. The paper stop preferably comprises a slidable and lockable tab that extends out from a slot in the machine housing several inches above when the paper edges are inserted into the die assembly. In order to reduce the number of times the stop must be adjusted, the die assembly according to this invention preferably also includes a end-justified hole and pin pattern. This means that the holes in each different die assembly, instead of being longitudinally centered on either side of the die transverse centerline and instead of being centered in a 14-inch long area, are instead moved to one side or the other, so that the die holes are near the same transverse reference line near one end of the die. This reference line, then, becomes the preferred location for the paper stop and the paper edge and is positioned in the same place on all die assemblies. Thus, 8½-x-11-inch paper may be punched in every die assembly made according to this system without the paper stop having to be adjusted. With this system, the holes and pins required to punch the desired pattern in the 8½-x-11-inch paper are automatically centered properly in the first 11 inches from the reference line. Only when the user wishes to switch to a longer paper, such as 14-inch long paper, or a paper shorter than 11 inches, does the user need to reset the paper stop.

Figure 7A:
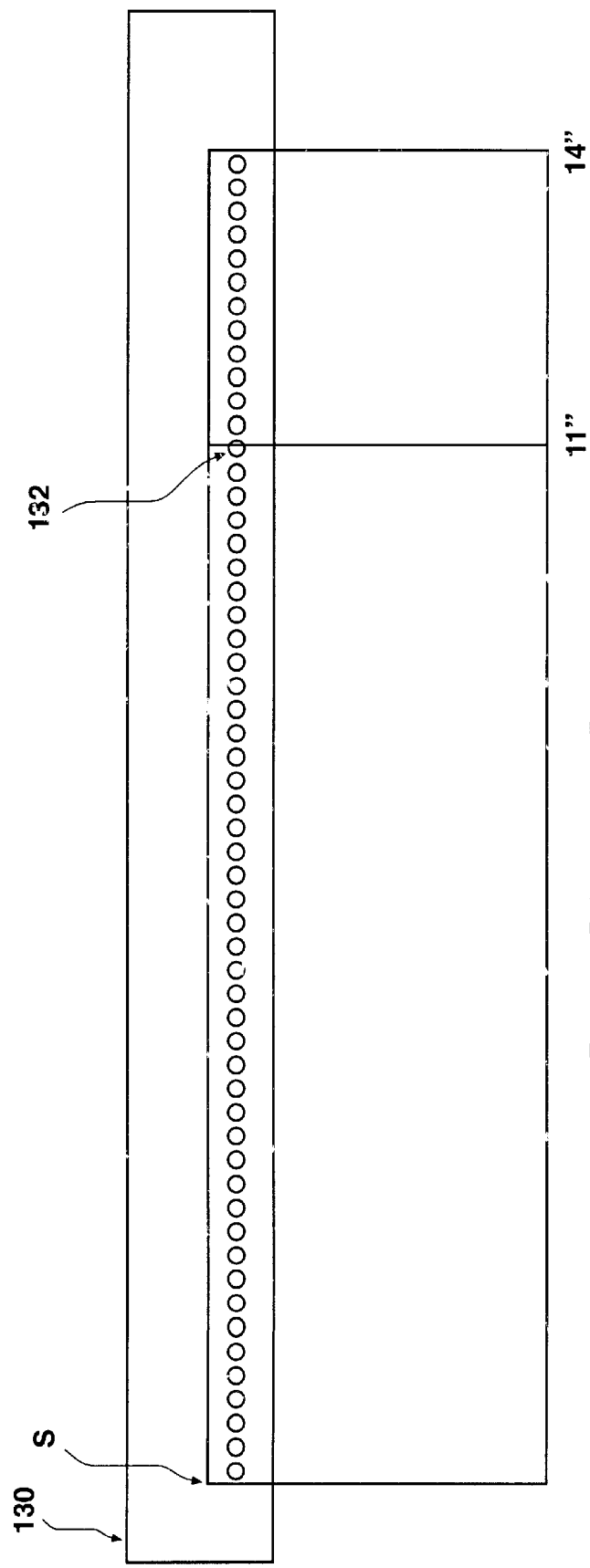
FIGS. 7A and B are schematic front views of two prior art dies, which require paper stop adjustment when changing from 14-inch long paper to 11 inch long paper and when changing dies while punching 11-inch paper.
Figure 7B:
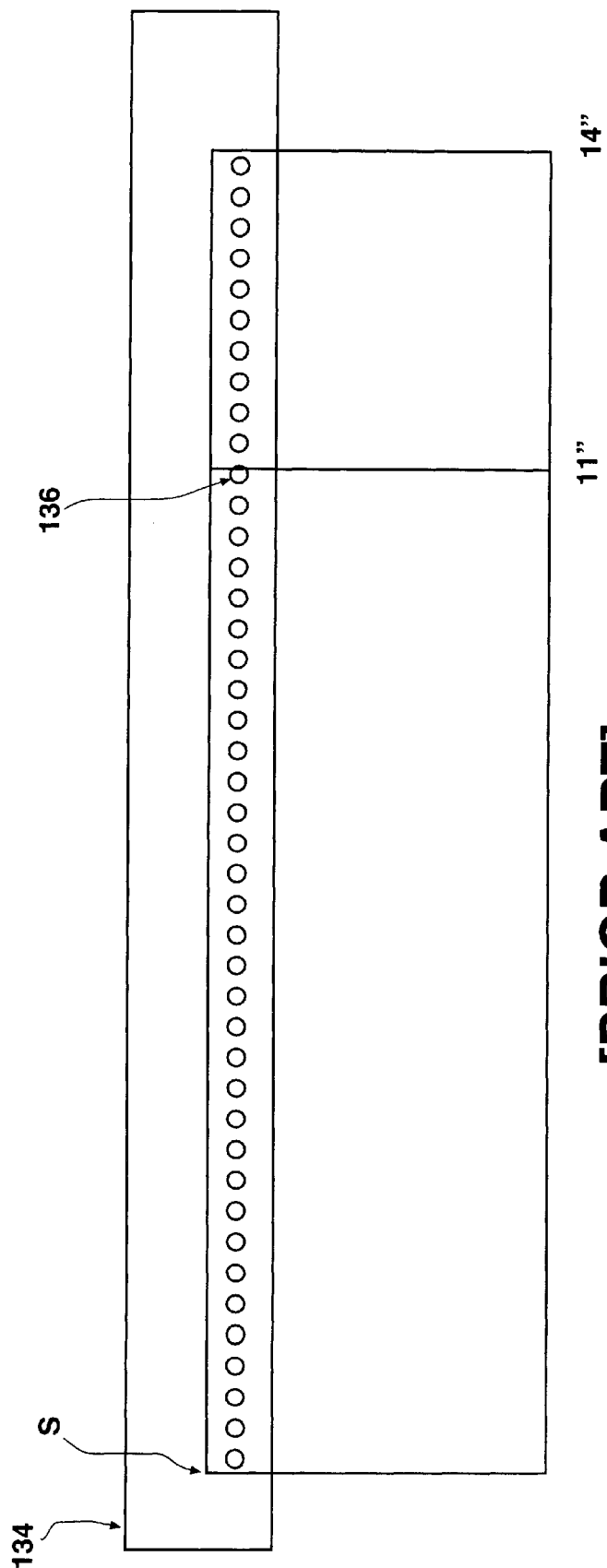
FIGS. 7C and D are schematic front views of two dies according to the invention, which have end-justified hole patterns for 11-inch long paper.
Figure 7D:
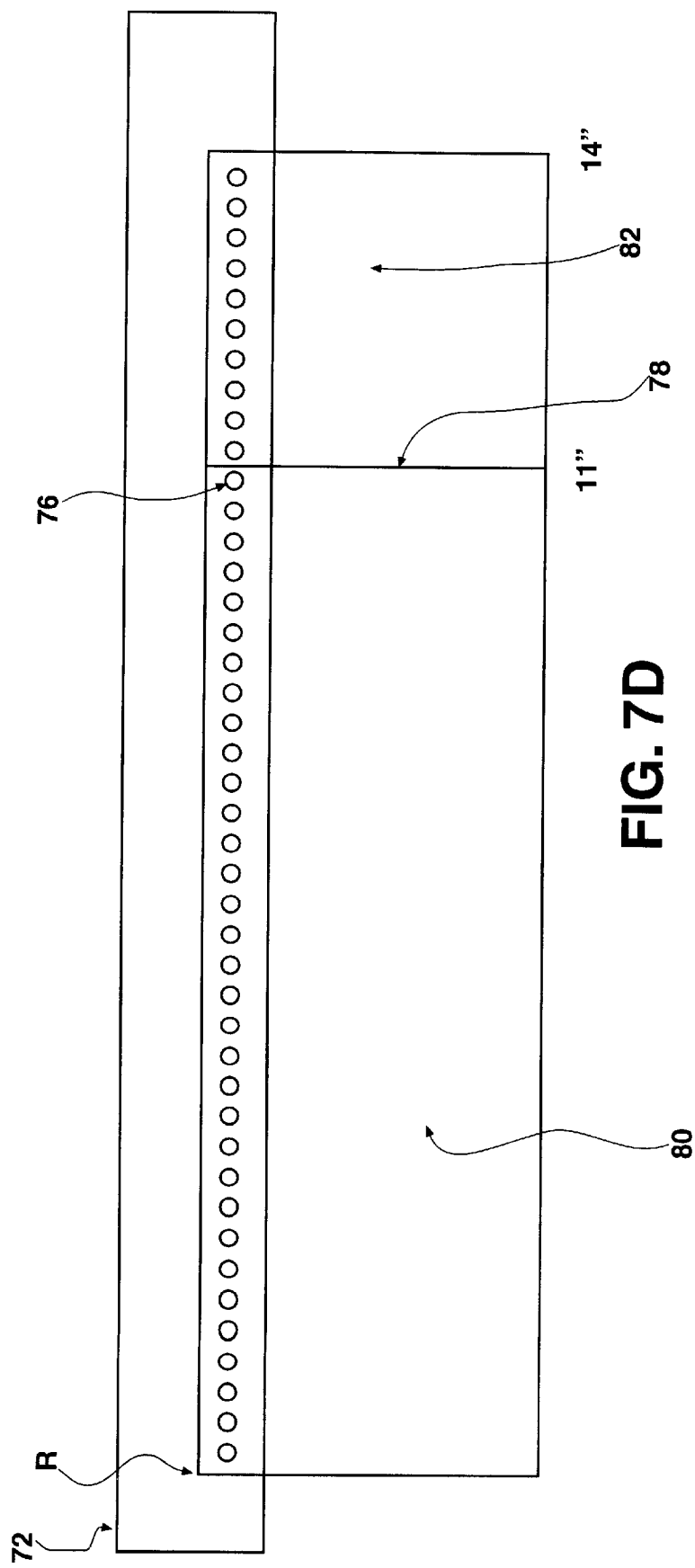

The end-justified system is illustrated in FIGS. 7 C and D, by die assemblies 70 and 72. The paper stop and the 8½-x-11-inch paper edge are placed at the reference line "R" near the left end of the dies 70 and 72. Because the die assembly pins and holes are positioned to be centered in the area covering the first 11 inches to the right of the reference line R, switching dies does not result in off-centered holes or right-edge holes 74, 76 that are at or off of the paper edge 78. Thus, the reference line R forms the left side of a first area 80 in which holes and pins are centered for punching 11-inch paper, and the second area 82 to the right of the first area is additionally used for longer paper. Sometimes the spacing and size of a die's holes will require that a pin be removed at the right edge of the 11-inch paper, but when this is done, the remaining pins in the first area 80 are centered in the area 80. The overall result of this system is a savings of time and paper.

The invented punch machine may be summarized as comprising a die assembly comprising a front portion and a back portion adapted to move relative to each other to cut paper or other sheets placed in the die assembly. The die assembly mounting means comprises a slidable connection between the die assembly back portion and a driving means such as a push bar. The mounting means also comprises a clamp means for holding the die assembly front portion in a stationary forward position while the back portion is moved forward and backward by the driving means. Preferably, the mounting means does not include bolting, screwing, or any other threaded connection of the die assembly onto any part of the punch machine.

In an especially-preferred embodiment of the invented die assembly, illustrated in FIGS. 8–11, the die assembly is adapted to include one or more features that make the die assembly 200 easier to handle and install. These features are not required for proper operation of the die assembly, but they tend to make the punch machine and die assembly 200 more "user-friendly" during handling and installation. These features make the die assembly 200 less prone to accidents in which the pin retainer and/or some or all of the pins fall out of the die assembly, and result in frustration and waste of time.

One of the features is a pin strap 220 that lies across the pin heads 53 to hold them from falling out of the pin retainer 234. The pin strap 220 preferably is pivotal, bendable, or otherwise movable away from the pins, so that the pins may easily be reached. The preferred pin strap pivots around the right connector 222 so that is swings forward or backward in FIGS. 8 and 9 generally parallel to the pin retainer.

The pin strap 220 includes a latch mechanism to connect the otherwise-free left end 224 to the left end of the pin retainer 234. The preferred latch mechanism includes frictional engagement of the end of the pin strap 220 between the back surface of the pin retainer 234 and the head 230 of the left connector 232. Other frictional latch mechanisms may be used, but preferably they do not require the loosening of bolts, screws, or other tool-operated connectors. For example, the head of the connector is only one embodiment of a protrusion or hook-receiver on or above the pin retainer 234 back surface that may be used to frictionally receive and releasably and temporarily hold a pin strap hook member 235.

Figure 9:
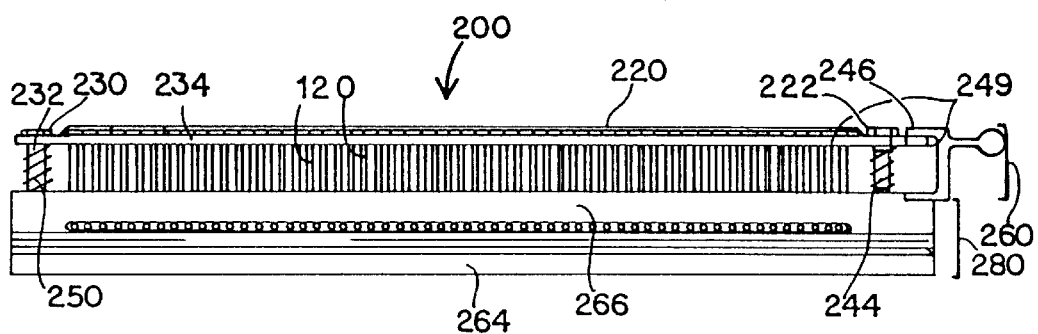
FIG. 9 is a top view of the die assembly of FIG. 8.
Figure 10:
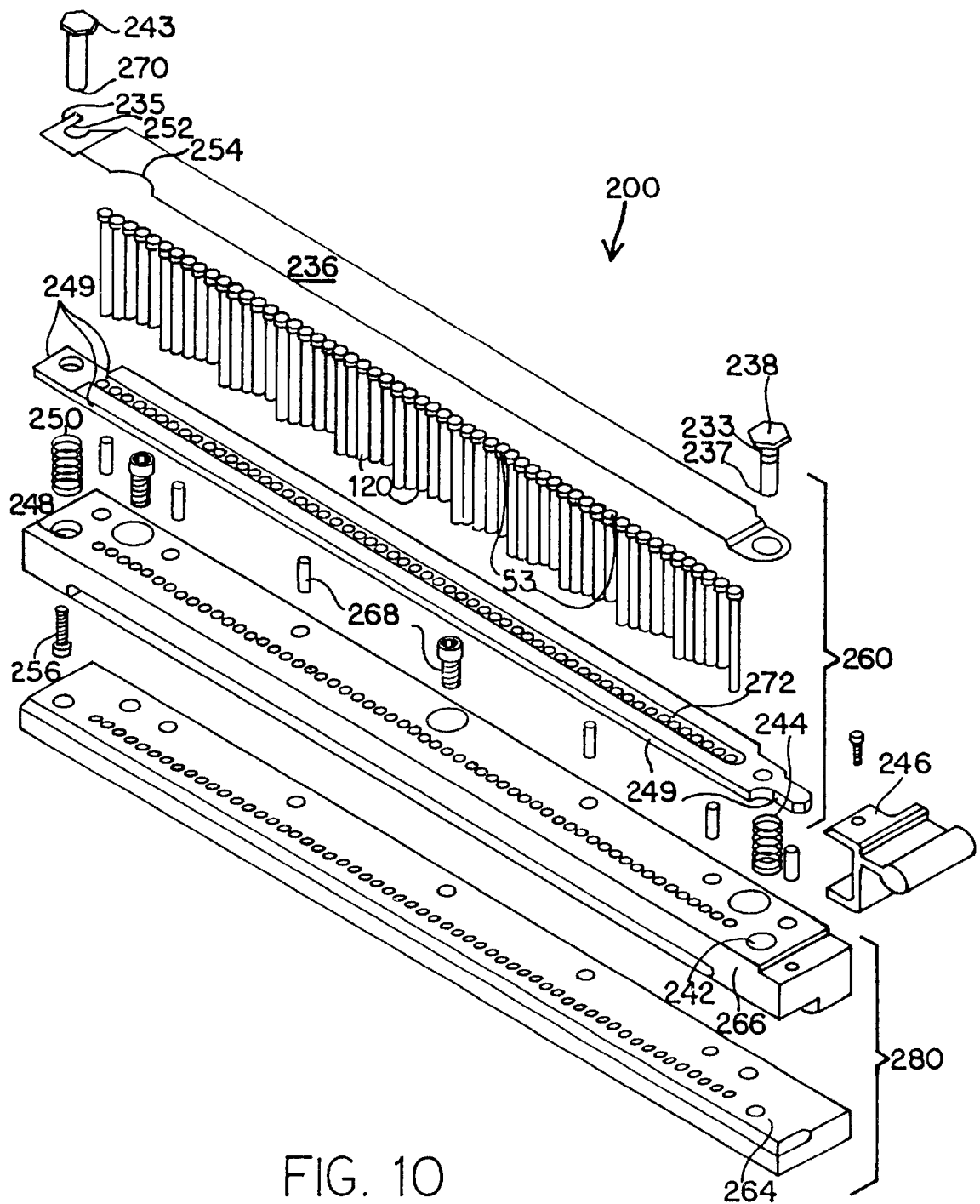
FIG. 10 is an isometric, exploded view of the pieces-parts of the die assembly of FIG. 8.

The pin strap 220 is preferably a single strap extending across all the pin heads and being anchored at both ends (including at least one removable or temporary anchoring), and contacts the pin head end surfaces but does not necessarily encase, contact or engage the pins in any other way. The back extent of the pin strap, which in the preferred embodiment is the top surface 236 of the strap, preferably extends only above the pin retainer 234 an allowed distance, which is at most equal to the thickness of the pin heads plus less than about 1 millimeter, resulting in the pin strap fitting well into the push-bar slot along with the pin retainer 234 and pin heads. Also, as best illustrated in FIG. 9 and FIG. 10, any means of connecting the pin strap or latching the pin strap (such as the left and right connectors discussed below) should not extend out from the pin retainer 234 more than the small allowed amount and should not extend sideways from the centerline of the pin strap to bind on the push-bar caps or interfere with smooth installation of the die assembly 200. For example, the left and right connector heads 230, 238 should be sized to not bind on the push-bar caps or otherwise impact the push-bar.

The pin strap is preferably but not necessarily made of spring steel or other slightly flexible and resilient material, so that is strong but has a degree of resiliency that preserves its effectiveness and preferably tends to keep it against the pin heads even after many latchings and unlatchings.

Another preferred feature is a connection mechanism which is adapted to connect the back portion 260 to the front portion 280, while still allowing the back portion to move forward and backward relative to the front portion (die) during operation. The preferred connection mechanism comprises a right connector 222 and left connector 232 that extend from the front portion to the pin retainer.

Figure 8:
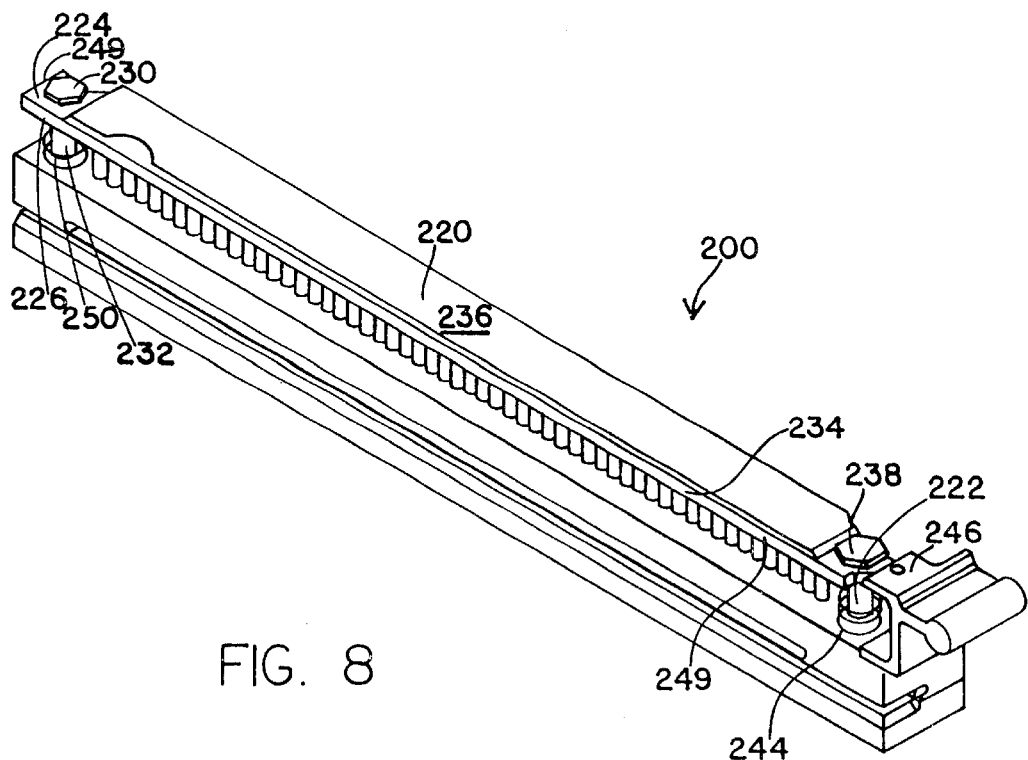
FIG. 8 is an isometric view of an alternative, especially preferred embodiment of the invented die assembly, including a pin strap and a positioning system.
Figure 11:
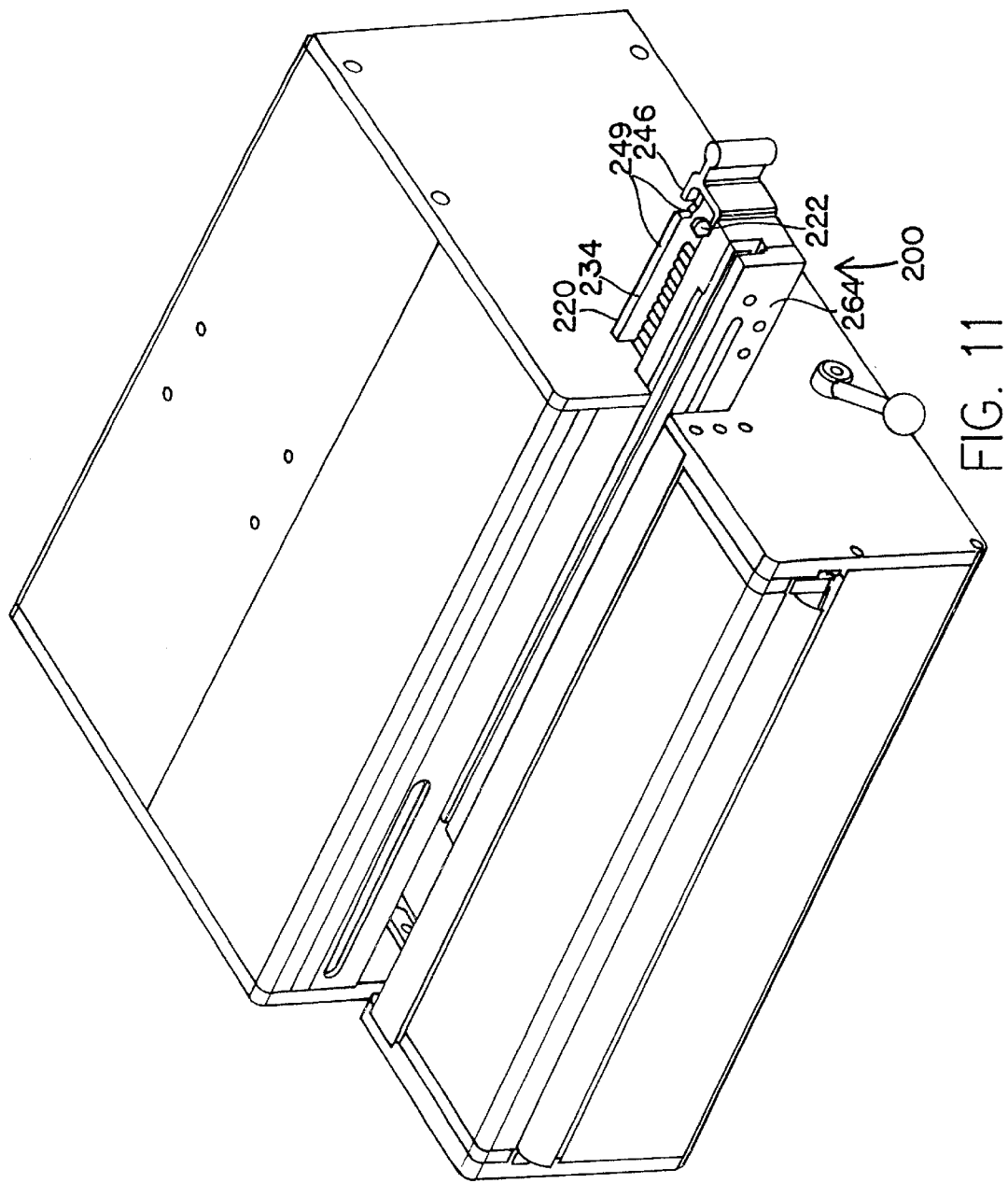
FIG. 11 is an isometric view of one embodiment of the invented punch machine including the invented die assembly of FIGS. 8–10 partially installed into the machine.

The right connector 222 back end 233 is preferably threaded into the pin retainer 234, so that it is fixed to the pin retainer. The right connector 222 front end 237 slidably extends into a hole 242 in the front portion so that it moves forward and backward with the pin retainer 234. The right connector passes through a right spring 244 which biases the right end of the pin retainer 234 with its associated pins out into the preferred biased position. The handle includes a protrusion or other stop member 246 that acts as an upward stop against which hits the pin retainer 234 (or optionally, another part of the back portion) to limit its movement out from the die. As illustrated in FIGS. 8, 9, and 11, the stop member 246 extends around the outer edge surface, that is, outer perimeter 249, of the pin retainer 234, in order to limit backward movement of the back portion.

The left connector 232 back end 243 is mounted in a hole 248 near the left end of the die and slidably extends through the left end 226 of the pin retainer. This way, the pin retainer slides forward and backward on the connector during operation. A left spring 250 surrounds the left connector and biases the left end of the pin retainer out from the die to the biased position against the bottom surface of the left connector head 230, with, optionally, the pin strap left end in-between.

Preferably, the latch of the pin strap 220 cooperates with the left connector 232, in that the pin strap end 224 curves around to form a hook 235 that extends around the left connector between the connector head 230 and the top surface of the pin retainer. Thus, the left spring supplies force to frictionally hold the pin strap end between the connector head and the pin retainer, until the user purposely slides the pin strap end out from between the pin retainer and the connector head. The pin strap latch may further comprise a tab 252 that protrudes downwardly from the pin strap end to extend down along the pin retainer on a side opposite from the side to which the pin strap preferably pivots, so that the tab 252 "catches" on the pin retainer side to provide an additional means of temporarily/removably latching the pin strap in position. When the user wishes to unlatch the pin strap, he/she pushes the left end of the pin retainer down slightly by accessing it through one or more indentations 254 in the pin strap, and, thus, moves the pin retainer away from the connector head to loosen the compression on the pin strap end. With the pin strap end thus loose between the pin retainer and the connector head, the pin strap end may be pivoted around the right connector to the side of the pin retainer (toward the viewer of FIGS. 8, 9 and 10) with the tab now clearing the pin retainer.

Another feature of the die assembly 200 of FIGS. 8–11 that is optional but preferred is the adaptation of the left connector to be "floating" or otherwise adjustable. While the pin retainer slides on the left connector and may therefore adjust during installation to variations in the exact location of the push-bar, the left connector preferably also should adjust or "float" in order to likewise adjust to the push-bar location. The preferred left connector, therefore, is slidably mounted in its hole 248 to an extent that will allow it the leeway to travel about ⅛ inch forward from its furthest backward portion. Preferably, this leeway is in the range of about ¹⁄₁₆–¼ inch for a connector that is normally biased out about 1 inch from the die, or, in other words, about ¹⁄₁₆–¼ of the distance of the normal biasing distance from the die. This leeway allows the front end 270 of left connector 232, in effect, to slide in/out from its die hole to move into correct position for sliding into the slot of the push-bar. For example, when a machine is turned off for die assembly replacement and the push-bar is slightly forward from its original or "normal" or "standard" position, due to wear, repair, or other factors, that slight difference in its position may be accommodated by the floating of the left connector so that the left connector, the left end of the pin retainer, the left pins, and the left end of the pin strap may all align with the push-bar slot opening and smoothly slide in without binding or impacting the push-bar. The right connector, by virtue of it being mounted to slide along with the pin retainer to a fully forward and fully backward position, is also adapted to accommodate the slight variations in the push-bar location during installation of the die assembly.

The floating feature of the left connector may be accomplished by the left connector being retained in the hole 248 by a set screw 256 or other fastener that holds the left connector in its hole but allows that small amount of leeway in its position. The set screw head is retained between the two plates of the die (front plate 264 and rear plate 266 connected by pins/screws 268) of the die and the set screw threaded shaft extends into the rear plate to thread into the threaded front end 270 of the left connector. The set screw head therefore "floats" between the two plates an amount which allows the connector to also "float" the desired distance.

The above features may therefore be described as two general systems: a pin strap system and a positioning system. The combination of both systems adapts the die assembly 200 to be convenient to use, maintain and store.

In summary, the pin strap system keeps the pins in place during handling of the die assembly outside of the punch machine, while being retractable, pivotal or otherwise moveable so that pin access is easy and does not require removal of bolts, screws, or other "permanent" pin backing mechanisms. The pin strap system stays conveniently in place during installation of the die assembly into the punch machine, as shown in FIG. 11, but does not interfere with smooth insertion and operation of the die assembly. The preferred pin strap is not bolted to or otherwise directly attached to the driving mechanism of the punch machine, but is rather received as a generally passive element between the driving (push) bar and the driven pin retainer, except that the push-bar impacts the pin strip as the push-bar pushes on the back portion of the die assembly. Therefore, the pin strap should be strong and durable to withstand the repeated impacts during operation. The pin strap system is preferably very thin and is slightly flexible and/or resilient, so as to fit in the very small space between the pin heads and the surface of the push-bar slot.

Preferably, the pin retainer includes an elongated recess 272 in its back surface to allow the pin heads to be slightly recessed in, but not imbedded or surrounded by, the pin retainer. This recess may be used to adapt the die assembly as a retrofit for older machines that may not otherwise have enough room in the push-bar slot to receive both the pin retainer and the pin strap. Thus, the push-bar C-channel or slot, which may serve in some embodiments as the only means of holding the pins in the pin retainer, instead serves in the embodiments of FIGS. 8–11 to slidably receive both the pin retainer and also the pin strap.

Alternative pin strap embodiments are illustrated in FIGS. 12–16. These alternative pin straps illustrate that various easily releasable latch mechanisms may be used and various directions of movement may be used for moving the pin strap for access to the punch pins.

FIGS. 12 and 13A and B illustrate an embodiment of pin strap 320 that is shaped generally similarly to the previously-described pin strap 220, but that includes a prong-shaped latch mechanism 322 rather than a hook-shaped latch. To latch the pin strap 320, the pin strap is slid left in FIG. 13 and the prongs 324 are slid underneath the connector head 230 to latch frictionally. For unlatching, the pin strap 320 is pulled upward away from the pin retainer 234 and pin heads (not shown in FIGS. 12–16), which may be described as flexing or pivoting in the "vertical plane" of FIG. 13A, or, in other words, the pin strap 320 pivots relative to the pin retainer 234 perpendicular to the pin retainer back surface 267 and preferably parallel to the pin retainer longitudinal axis. The pin strap 320 tends to flex upwards (when oriented as in FIG. 13A) at its middle, and the prongs 324 slide away from the head 230 of the left connector. The pin strap 320 may be flexed sufficiently away from the pin retainer and pin heads to access the pins, or may be flexed and then pivoted around the right connector 222 in a "horizontal plane" (when oriented as in FIG. 13A). Alternatively, as discussed below, a small hinge may be added to the body of the pin strap to enhance the pivoting.

Figure 16:
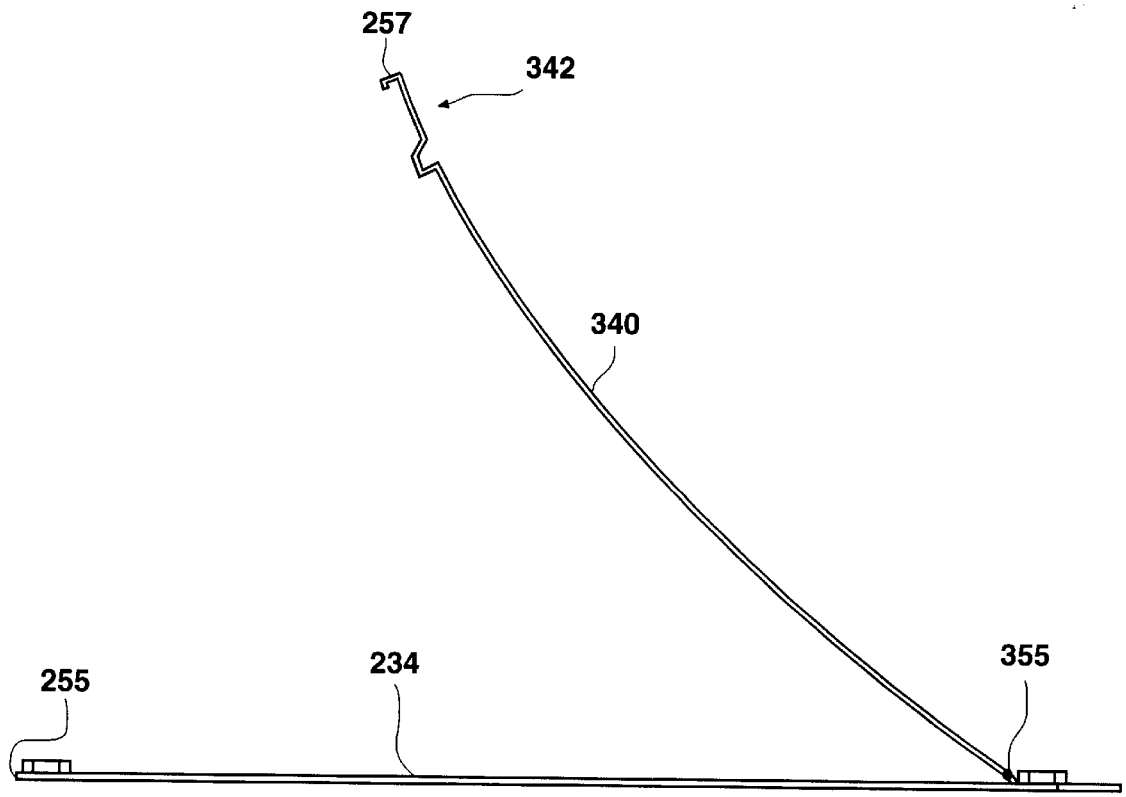
FIG. 16 is a side view of yet another pin strap embodiment having a hinge.

FIGS. 14A and B illustrates a pin strap 340 with a snap latch 342 that latches the pin strap by snapping over the top surface of connector head 230, and that, when un-snapped, flexes in the "vertical" plane (plane perpendicular to the back surface 267) of FIG. 14A, to move away from the pin retainer and the pins. The pin strap 340 may also pivot "horizontally" around the right connector 222, or, as illustrated in FIG. 16, may include a hinge near the right end to facilitate pivoting away from the pins. Preferably, the end 257 of the snap latch 342 resiliently snaps over the head 230, but, alternatively, the end 257 may be adapted and lengthened to snap over and frictionally engage the end 255 of the pin retainer to secure the pin strap in place. Hence, a preferred pin strap latch may be said to secure by snapping down over or near the left connector. The snap latch 342 should be sufficiently thin to fit on the head 230 without interfering with movement and use of the die assembly.

FIGS. 15A and B illustrate that hook-style latch mechanisms may be used other than the design shown in FIGS. 8–10. Such hook-style latches provide for the pin strap 350 to pivot horizontally to place the hook 352 around the left connector head 230. The hook-style pin strap latch of FIG. 15A and B slides around the left connector and snaps into place to be frictionally held in place, with the help of the prong protrusion 353. Thus, the pin strap 350 may be moved away from the pins by a combination of the "horizontal" pivoting (to unlatch the hook 352), plus "vertical" flexing up away from the pin retainer 234, and by an optional hinge, if desired.

FIG. 16 illustrates the point that a hinge mechanism may be added to the pin straps of the prevent invention. For example, the pin strap 340 of FIGS. 14A and B is illustrated in FIG. 16 with an additional pivoting hinge 355 that pivotally connects a right portion of the pin strap to a left portion, preferably in a plane normal to the back surface of the pin-retainer plate. A hinge is expected to improve the ease with which the pin strap is moved away from the pins and may improve durability and reliability of the pin strap. With the addition of a hinge, a pin strap may be used that is less flexible, or not flexible at all, and the pin strap may rely on the hinge substantially for its pivoting away from the pin retainer and pins.

In summary, the positioning system connects the pin retainer to the die and temporarily biases it out to generally the appropriate position relative to the die so that the assembly may be inserted through the wall of the punch machine and into slidable connection with the push-bar. The positioning system is used to replace the technique of the user having to estimate the proper position of the die and pin retainer and then having to manually slide and hold the pin retainer in that position to begin insertion of the die assembly through the punch machine wall and into the push-bar slot. When the die assembly is in place in the machine, the positioning assembly does not interfere with operation of the die assembly, because the positioning apparatus either slides along with the pin retainer or allows the pin retainer to slide on it. The positioning system connectors may optionally include the feature that part or all of it floats slightly forward and/or backward to compensate for the possibility that the push-bar may not stop in the same place for each punch machine or each time, due to manufacturing variances and/or wear or replacement of parts.

Although this description and the claims refer to the punch machine and die assembly being used with paper, the invention is not intended to be limited to only this use. The invented punch machine and the improvements therein may be adapted for punching or cutting other types of sheet material.

Although the above description refers to "right" and "left", "front" and "back", these terms are used to increase the clarity of the description and to relate the die assembly to its position in the punch machine embodiment as it is portrayed in the drawings, but these terms are not intended to limit the invention, punch machine or die assembly to a particular orientation.

Although this invention has been described above with reference to particular means, materials and embodiments, it is to be understood that the invention is not limited to these disclosed particulars, but extends instead to all equivalents within the scope of the following claims.

We claim:

1. A paper punch machine die assembly comprising:

a front portion and a back portion;

wherein said front portion comprises an elongated die having a longitudinal axis, a slot parallel to the longitudinal axis for receiving paper and a plurality of die holes extending perpendicularly to the longitudinal axis; and wherein said back portion comprises:

an elongated pin-retainer plate generally parallel to said elongated die and having a front surface, a back surface, a longitudinal axis, and a plurality of retainer holes extending through said plate from the back surface to the front surface;

a plurality of punch pins slidably extending through said retainer holes, each punch pin having a first end with a head in back of said plate and abutting said plate back surface and a second end extending from said plate front surface to said elongated die and slidably received in one of said die holes;

wherein the die assembly further comprises:

a connector slidably connecting the pin-retainer plate to the front portion so that the pin-retainer plate slides forward and backward relative to the front portion;

a flexible strap connected at one end to the back surface of the pin-retainer plate, extending across the heads of said pins and holding the pins in the pin-retainer plate, the strap flexing away from the pin heads to reveal the pin heads for removal; and a latch releasably connecting a second end of said strap to the pin-retainer plate.

2. A paper punch machine die assembly as in claim 1, wherein the latch comprises a hook on the second end of said strap releasably extending part way around the connector in a plane parallel to the pin-retainer plate.

3. A paper punch machine die assembly as in claim 1, wherein the latch snaps over the connector to releasably connect the second end of said strap to the pin-retainer plate.

4. A paper punch machine die assembly as in claim 1, wherein the latch snaps over an end of the pin-retainer plate to releasably connect the second end of said strap to the pin-retainer plate.

5. A paper punch machine die assembly as in claim 1, wherein the latch further comprises a hinge on which the strap pivots in a plane perpendicular to the back surface of the pin-retainer plate.

6. A paper punch machine die assembly comprising:

a front portion and a back portion;

wherein said front portion comprises an elongated die having a longitudinal axis, a slot parallel to the longitudinal axis for receiving paper and a plurality of die holes extending perpendicularly to the longitudinal axis; and wherein said back portion comprises:

an elongated pin-retainer plate generally parallel to said elongated die and having a front surface, a back surface, a longitudinal axis, and a plurality of retainer holes extending through said plate from the back surface to the front surface;

a plurality of punch pins slidably extending through said retainer holes, each punch pin having a first end with a head in back of said plate and abutting said plate back surface and a second end extending from said plate front surface to said elongated die and slidably received in one of said die holes;

wherein the die assembly further comprises:

a connector slidably connecting the pin-retainer plate to the front portion so that the pin-retainer plate slides forward and backward relative to the front portion;

a strap connected at one end to the back surface of the pin-retainer plate, extending across the heads of said pins and holding the pins in the pin-retainer plate, the strap pivoting away from the pin heads in a plane parallel to the pin-retainer plate back surface to reveal the pin heads for removal; and a latch releasably connecting a second end of said strap to the pin-retainer plate.

7. A paper punch machine die assembly as in claim 6, wherein the latch comprises a hook on the second end of said strap releasably extending part way around the connector in a plane parallel to the pin-retainer plate.

8. A paper punch machine die assembly as in claim 6, wherein the latch snaps over the connector to releasably connect the second end of said strap to the pin-retainer plate.

9. A paper punch machine die assembly as in claim 6, wherein the latch snaps over an end of the pin-retainer plate to releasably connect the second end of said strap to the pin-retainer plate.

10. A paper punch machine die assembly as in claim 6, wherein the latch further comprises a hinge on which the strap pivots in a plane perpendicular to the back surface of the pin-retainer plate.

* * * * *